March 7, 1939. W. T. MAIDENS 2,150,072
PROCESS OF MAKING ZINC OXIDE
Filed Dec. 13, 1933
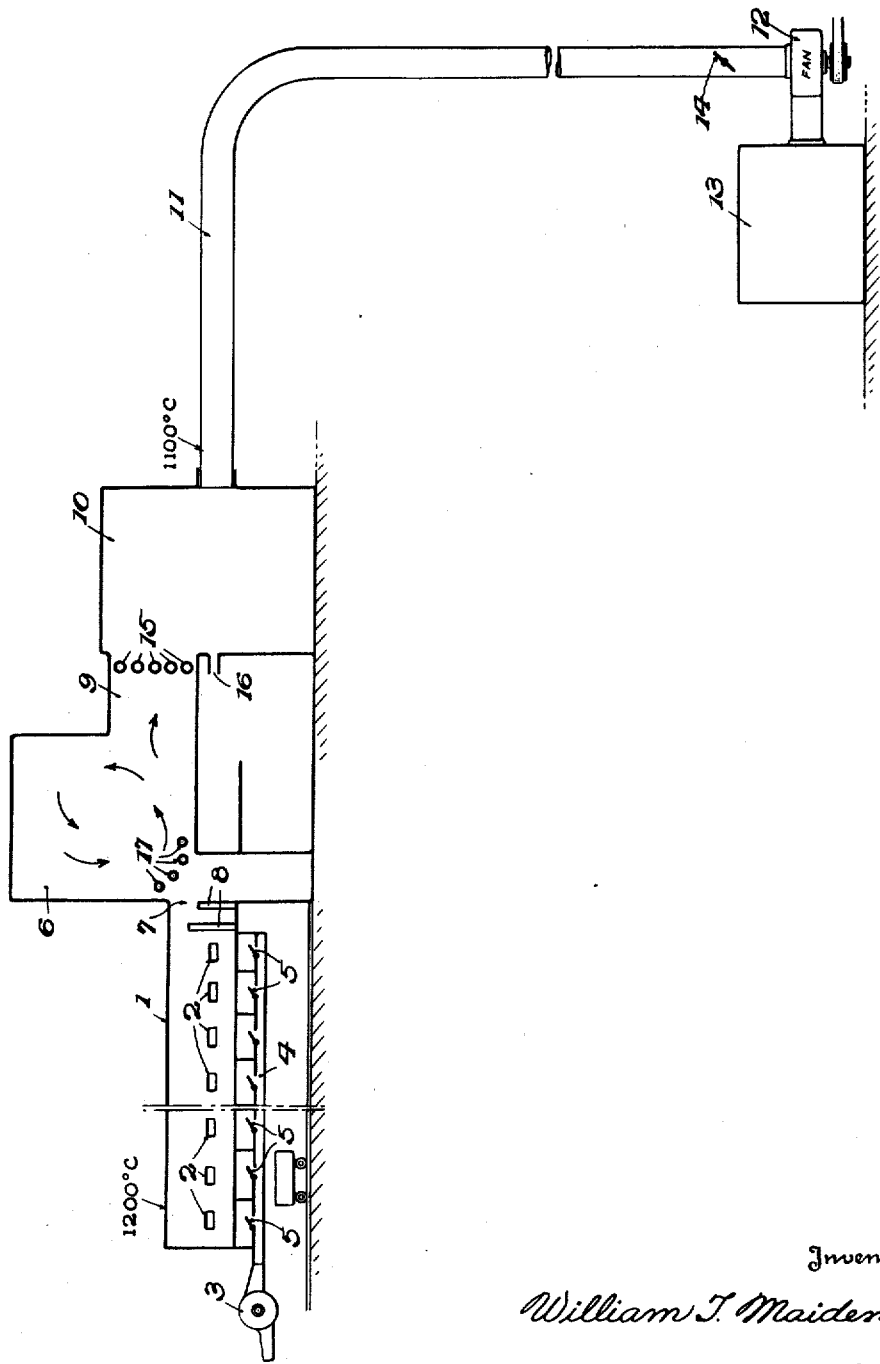
Inventor
William T. Maidens
By Cameron, Kerkam & Sutton
Attorneys Patented Mar. 7, 1939

2,150,072

UNITED STATES PATENT OFFICE 2,150,072

PROCESS OF MAKING ZINC OXIDE

William T. Maidens, Columbus, Ohio, assignor to American Zinc, Lead & Smelting Company, St. Louis, Mo., a corporation of Maine Application December 13, 1933, Serial No. 702,252

11 Claims. (Cl. 23—148)

This invention relates to improvements in the manufacture of zinc oxide and more particularly to methods for controlling the shape of the particles. According to one well-known method for making zinc oxide a mixture of coal and zinc ore is spread upon a flat grate through a series of charging doors of a suitable furnace and at a high temperature (approximately 1400° C.) the zinc ore is reduced to metallic zinc and volatilized as a gas. As the zinc vapor, diluted with the products of combustion, passes over the charges of coal and zinc ore, it becomes oxidized through the action of air admitted to the furnace and, as it alternately meets fresh amounts of zinc vapor and air, the particles of zinc oxide that are formed grow into needle shape, as is clearly disclosed under the microscope. The relatively coarse pigment particles of zinc oxide follow an irregular path through the flue and are finally delivered by suction to a trail where they are cooled so that they can be safely filtered in a bag room.

In the operation of such a plant the charges of coal and zinc ore are delivered at periodic intervals to the grate, so that by the time the last charge is inserted through the last door in the series, the ash or clinker is ready to be withdrawn from the point where the first charge was inserted and a new charge is introduced. Under these conditions the characteristics of the product formed are continually changing; and further, weather conditions and other factors beyond the control of the furnace operation make it impossible to obtain a uniform product of the desired quality.

According to the present invention, the furnace is operated under more uniform conditions. The charges of coal and zinc ore are introduced into the furnace as heretofore, but the draft of air to the furnace to support combustion is limited and so regulated that the products, instead of being a mixture of zinc vapor and zinc oxide with CO, $CO_2$ and nitrogen, consist of no zinc oxide and a ratio of carbon monoxide to carbon dioxide sufficient to maintain the zinc in the elemental state at the furnace temperature, which is preferably maintained at approximately 1200° C. This regulation of the draft of air results in an atmosphere practically completely non-oxidizing to zinc vapor above the charge in the furnace. The gases and zinc vapor under a slight positive pressure are then withdrawn from the furnace. In order to maintain the flow of gas uniformly, it is desirable to control the suction in the trail. The temperature and composition of the gases can be held very uniform and this plays an important part in the uniformity of the zinc oxide made by this process.

In the reduced state the gases from the furnace are passed to a suitable insulated tower or chamber where they are momentarily (one or more seconds) held at a high temperature, and thence to a point where air is either sucked or blown in under regulated volume and velocity, so that the zinc burns with a lazy flame. The amount of air introduced at this point is of importance and should be so controlled that the combined effect of the introduction of the air and the combustion of the zinc vapor will not reduce the temperature, though there may be a slight drop due to radiation losses and there may be an increase in temperature. The zinc oxide, as formed, and the zinc vapor slowly mix and form the desirable uniform long needles. The amounts and places of introduction of the auxiliary air are so controlled that after refining, (reheating) the properties of the oxide, such as for instance the oil absorption as determined by the Coleman-Gardner test, can be uniformly controlled as may be desired over the range of commercial requirements The oil absorption property of the acicular zinc oxide thus produced can be varied by the size of the openings for the auxiliary air and the degree of laziness of the flame with which the zinc vapor burns.

For the purpose of enabling the invention to be better understood, reference is made to the accompanying drawing which is a diagrammatic view of one form of plant for making the acicular or needle shaped particles of zinc oxide.

In the drawing, in which like reference numerals indicate like parts throughout, I represents a furnace provided with any suitably perforated grate, either stationary or travelling, as may be desired, and 2 indicates charging openings for introducing coal and zinc ore into the furnace. The draft of air passing up through the grate for supporting combustion is regulated and controlled by any suitable means well known in the art, care being taken to so regulate this supply of draft air that the atmosphere above the grate shall be at all times a practically non-oxidizing atmosphere consisting of the products of combustion and the vaporized zinc. As here shown, the draft of air to the furnace is regulated or controlled by means of a fan 3 delivering air under low pressure to a conduit 4, and the passage of air from said conduit to the several sections of the furnace is controlled by suitable dampers 5. Due to blow holes in the charge there may be some small amount of oxygen get into the furnace, but this will be consumed by an excess of reducing gas in the furnace. Any zinc oxide particles formed under these conditions are small, and at the high temperature are easily reduced by the CO, so that the gases leaving the furnace consist of a mixture of CO, $CO_2$, nitrogen and zinc vapor with practically no zinc oxide. The temperature and composition of these gases can be held very uniform and this plays an important part in the uniformity of the zinc oxide made by this process. The temperature in this furnace may vary somewhat above or somewhat below 1200° C. 6 indicates the usual or any suitable insulated tower into which the fumes from the furnace pass through an opening 7 which is suitably controlled by baffles 8 to maintain a degree of back pressure in the furnace. The mixed products of combustion and zinc vapor, at a temperature of approximately 1200° C., pass from the tower 6 through a channel 9 and into a combustion chamber 10, from which chamber 10 they are drawn out, at a temperature of approximately 1100° C., through the trail 11 by means of a suction fan 12 and pass into the bag room 13. It will be apparent that, since the reaction involved generates heat when the concentrated zinc gases are oxidized, the results obtained would not be materially changed if the temperature in the tower 6 should be somewhat lower than that of the furnace, provided the temperature be held uniform. The rate of movement of the vapors from the furnace and of the zinc oxide particles and gases on the way to the bag room may be controlled by the speed of the fan 12, and if desired, by a suitable valve 14 introduced in the trail.

As the products of combustion and zinc vapor pass from the channel 9 into the chamber 10, air is introduced through openings 15 in the channel, and if desired, also through an opening 16 leading directly into the chamber 10. The air may be either sucked or blown in through the openings 15 and 16. If it is introduced under very low velocity to the end that the zinc burns with a lazy flame, the zinc oxide particles as they form and the zinc vapor slowly mix with each other with the result that the acicular or needle shaped particles are built up. The size of the openings 15 and 16 for the admission of air and the degree of laziness of the flame in the chamber 10 where combustion of the zinc vapors occurs, are subject to control to the end that properties of the oxide, such as oil absorption, may be successfully controlled. The zinc oxide and gases of combustion enter the trail 11 from the combustion chamber 10 at a high temperature, approximately 1100° C., although the temperature may vary somewhat above or below this within a range that will not materially affect the results obtained. In addition to the gases that have been mentioned as produced in the furnace there may be small amounts of impurities, such as free sulphur, sulphur compounds, tars and finely divided carbon. While the gases from the furnace are in the insulated chamber 6 where they are maintained for a short time (one or more seconds) at a high temperature, the tars and carbon are removed, presumably by reaction with the carbon dioxide in the gas, and if desired a small amount of air may be admitted through ports 17 at the entrance to chamber 6, care being taken not to admit sufficient air at this point to produce any appreciable amount of zinc oxide. This air however has the advantage of oxidizing sulphur and sulphur compounds into oxidized sulphur gases, and of more rapidly and completely removing tars and carbon.

It will be understood by those skilled in the art that the precise form of the plant indicated above may be varied without departing from the spirit of the invention. Moreover, it will be recognized that the temperatures herein given may vary somewhat above or somewhat below those given, but it is to be particularly pointed out that in making the acicular or needle shaped particles of oxide, the temperature of the combined gases and oxide particles as they enter the trail have been but slightly lowered from that at which they leave the furnace.

Having thus described the invention, what is claimed is:

1. The process of making zinc oxide of acicular form which consists in vaporizing zinc in a reducing atmosphere at approximately 1200° C., then slowly mixing the zinc vapor with an oxidizing agent outside the furnace while maintaining the temperature at a degree not materially above or below 1100° C. and then refining the outside.

2. The process of making zinc oxide of acicular form which consists in subjecting zinc ore to the action of burning coal in a closed furnace, so controlling the air draft to the furnace that the resulting zinc vapor is in a reducing atmosphere at a temperature of approximately 1200° C. in the furnace above the charge, passing the mixed zinc vapor and reducing gas to a chamber outside the furnace, and slowly introducing air into the mixture in such amount that the temperature in said chamber is maintained at a degree not materially above or below 1100° C., whereby the zinc vapor is burned with a lazy flame and acicular zinc oxide particles are formed.

3. The process of making zinc oxide which consists in vaporizing zinc in a reducing atmosphere at a temperature of approximately 1200° C. in a furnace, withdrawing the zinc vapor and reducing gases from the furnace into an oxidizing chamber while maintaining back pressure in the furnace, and then slowly admitting air into the oxidizing chamber in such amount that the temperature in said chamber is maintained at a degree not materially above or below 1100° C. and burning the zinc vapor with a lazy flame.

4. The process of making zinc oxide which consists in vaporizing zinc in a reducing atmosphere in a furnace at a temperature of approximately 1200° C., withdrawing the zinc vapor and reducing gases with any associated carbonaceous material into a less reducing atmosphere at approximately the same temperature, momentarily maintaining the high temperature, whereby the impurities are eliminated, and then conducting said vapor and gases into a combustion chamber and slowly admitting air into said chamber in such an amount as to burn the zinc vapor with a lazy flame.

5. The process of making zinc oxide which consists in vaporizing zinc in a reducing atmosphere at a temperature of approximately 1200° C., then withdrawing the zinc vapors and reducing gases into a chamber outside the furnace where they are momentarily maintained at approximately furnace temperature while air is slowly introduced in an amount such as not to oxidize the zinc vapors to any appreciable extent, whereby any associated carbonaceous materials are eliminated, and then passing the zinc vapors and reducing gases into a combustion chamber, and slowly admitting air into said chamber in an amount such that the temperature therein is not materially reduced thereby.

6. The process of making zinc oxide which consists in passing zinc vapors through a long combustion chamber and slowly introducing an oxidizing gas into said chamber at different points along its length at a rate to produce a lazy flame, whereby the growth of the oxide particles is controlled.

7. The process of making zinc oxide of acicular form, which consists in vaporizing zinc in a reducing atmosphere, and then slowly mixing the zinc vapor and an oxidizing agent in controlled condition to produce a lazy flame.

8. The process which consists in charging a series of Wetherill grates with zinc and carbonaceous material and vaporizing the zinc in a reducing atmosphere, and then slowly mixing the zinc vapor with an oxidizing agent in controlled condition to produce a lazy flame in the combustion chamber.

9. The improvements in the method of making zinc oxide by the oxidation of zinc vapor which comprises introducing air at low velocity and in controlled amount into a mixture of zinc vapor with a non-oxidizing gas and burning the zinc vapor at a temperature of about 1200° C. with a lazy flame to produce zinc oxide particles, maintaining said particles at approximately their temperature of formation in the presence of the burning zinc vapor for a relatively long time so that the zinc oxide as formed slowly mixes with said burning zinc vapor and forms acicular zinc oxide.

10. The improvement in the art of making zinc oxide by the oxidation of zinc vapor which comprises slowly introducing an oxygen-containing gas at low velocity and in controlled amount into a mixture of zinc vapor and a non-oxidizing gas at approximately the vaporizing temperature of zinc and slowly oxidizing the zinc vapor to produce a lazy flame.

11. In a process of manufacturing zinc oxide, the steps of subjecting zinc vapor in the presence of a non-oxidizing gas and at approximately the vaporizing temperature of zinc to the action of an oxygen-containing gas introduced under a controlled slow velocity to produce a lazy flame, whereby the resulting zinc oxide is maintained at approximately said temperature in the presence of the burning zinc vapor for a relatively long time and forms acicular particles.

WILLIAM T. MAIDENS.

CERTIFICATE OF CORRECTION.

Patent No. 2,150,072.　　　　　　　　　　　March 7, 1939.

WILLIAM T. MAIDENS.

It is hereby certified that error appears in the printed specification of the above numbered patent requiring correction as follows: Page 2, second column, line 23, for the word "outside" read oxide; and that the said Letters Patent should be read with this correction therein that the same may conform to the record of the case in the Patent Office.

Signed and sealed this 6th day of June, A. D. 1939.

Henry Van Arsdale (Seal)　　　　　　　　　　　　　　Acting Commissioner of Patents.

amount such that the temperature therein is not materially reduced thereby.

6. The process of making zinc oxide which consists in passing zinc vapors through a long combustion chamber and slowly introducing an oxidizing gas into said chamber at different points along its length at a rate to produce a lazy flame, whereby the growth of the oxide particles is controlled.

7. The process of making zinc oxide of acicular form, which consists in vaporizing zinc in a reducing atmosphere, and then slowly mixing the zinc vapor and an oxidizing agent in controlled condition to produce a lazy flame.

8. The process which consists in charging a series of Wetherill grates with zinc and carbonaceous material and vaporizing the zinc in a reducing atmosphere, and then slowly mixing the zinc vapor with an oxidizing agent in controlled condition to produce a lazy flame in the combustion chamber.

9. The improvements in the method of making zinc oxide by the oxidation of zinc vapor which comprises introducing air at low velocity and in controlled amount into a mixture of zinc vapor with a non-oxidizing gas and burning the zinc vapor at a temperature of about 1200° C. with a lazy flame to produce zinc oxide particles, maintaining said particles at approximately their temperature of formation in the presence of the burning zinc vapor for a relatively long time so that the zinc oxide as formed slowly mixes with said burning zinc vapor and forms acicular zinc oxide.

10. The improvement in the art of making zinc oxide by the oxidation of zinc vapor which comprises slowly introducing an oxygen-containing gas at low velocity and in controlled amount into a mixture of zinc vapor and a non-oxidizing gas at approximately the vaporizing temperature of zinc and slowly oxidizing the zinc vapor to produce a lazy flame.

11. In a process of manufacturing zinc oxide, the steps of subjecting zinc vapor in the presence of a non-oxidizing gas and at approximately the vaporizing temperature of zinc to the action of an oxygen-containing gas introduced under a controlled slow velocity to produce a lazy flame, whereby the resulting zinc oxide is maintained at approximately said temperature in the presence of the burning zinc vapor for a relatively long time and forms acicular particles.

WILLIAM T. MAIDENS.

CERTIFICATE OF CORRECTION.

Patent No. 2,150,072.   March 7, 1939.

WILLIAM T. MAIDENS.

It is hereby certified that error appears in the printed specification of the above numbered patent requiring correction as follows: Page 2, second column, line 23, for the word "outside" read oxide; and that the said Letters Patent should be read with this correction therein that the same may conform to the record of the case in the Patent Office.

Signed and sealed this 6th day of June, A. D. 1939.

Henry Van Arsdale (Seal)   Acting Commissioner of Patents.